Figure 1:
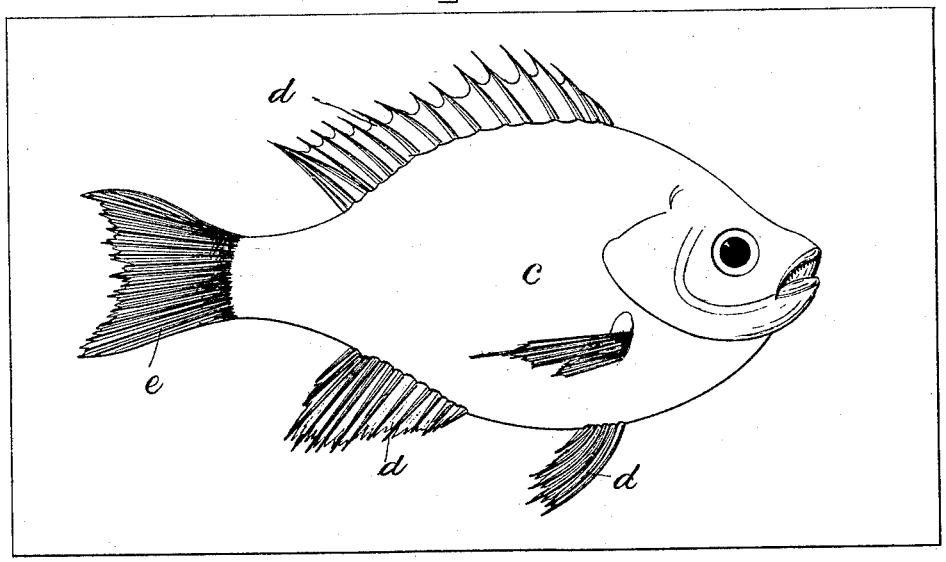

(No Model.)

H. E. DAVIDSON.
Ichthyological Taxidermy.

No. 233,078. Patented Oct. 12, 1880.

WITNESSES=
Arthur Reynolds,
L. F. Connor.

INVENTOR=
Human E. Davidson,
by Crosby + Gregory, Attys.

UNITED STATES PATENT OFFICE.

HERMAN E. DAVIDSON, OF GLOUCESTER, MASSACHUSETTS.

ICHTHYOLOGICAL TAXIDERMY.

SPECIFICATION forming part of Letters Patent No. 233,078, dated October 12, 1880.

Application filed September 11, 1880. (No model.)

*To all whom it may concern:*

Be it known that I, HERMAN E. DAVIDSON, of Gloucester, county of Essex, and State of Massachusetts, have invented an Improvement in Ichthyological Taxidermy, of which the following description, in connection with the accompanying drawings, is a specification.

My invention relates to icthyological taxidermy, or to a process of preparing and mounting the skins of fishes for cabinets of natural history, museums, &c.

The process hitherto practiced for mounting the skins of fishes consists in dividing the body of the fish on a median line and removing the soft parts from the skin, which is then stuffed with fibrous material, as chopped tow, after which the entire surface of the skin is treated with suitable varnish or preservative preparation. By this method it is very difficult to properly stuff the skins so as to give the proper convexity to its surface, and the process requires considerable skill in manipulations and considerable time for its proper execution.

My invention consists in forming a mold of plastic material—as, for example, plaster-of-paris—upon the body of the fish, and then removing the soft parts from the skin while in the mold, after which the skin may be treated with a suitable antiseptic preparation for preserving it, and will be stuffed or preferably filled with plastic material that will solidify thereon while still in the mold, which will retain the skin in the exact form that it had before the soft parts were removed, thus faithfully preserving, without skill on the part of the operator, the true appearance of the live fish.

When removed from the mold the outer surface of the skin may then be varnished or treated in any usual manner, and, with its stuffing or filling of solid material, may be mounted as desired for exhibition.

The mold may be conveniently formed in the following manner: As most fishes are symmetrical or alike on both sides, it is unnecessary to present but one side of the skin together with the median fins, such as the dorsal and ventral, &c., in order to have an accurate idea of the whole fish. The body of the fish is laid on its side on a piece of thin material, as thin wood or card-board, and the outline thereof is drawn upon the said board, which is cut through upon this outline, and the piece corresponding in shape to the outline of the fish removed. The fish is then laid in the opening thus made in the board, with the median fins, tail, &c., resting on one face thereof, after which the portion of the fish protruding beyond the other face of the board through the opening thereof is covered with thin oiled tissue-paper, paraffine, oil, or other suitable substance, to prevent the adhesion of the material of the mold, which is formed therein in any usual manner.

Plaster-of-paris in a semi-fluid condition may be used to form a mold, it being poured over the skin of the fish, protected from adhesion thereof, as before described. The plaster when set will form a perfect mold of hard material, and should be evened at the top, so that when turned over it will afford a good surface to rest upon for operating on the fish therein. The mold is then turned over and the opposite half of the skin of the fish, together with the soft parts, is removed from the portion of the skin lying in the mold, and which is then treated with preservative or antiseptic material, and stuffed or filled with plastic material, that, on solidifying, takes the place of and assumes the exact form superficially of the soft parts removed.

Figure 2:
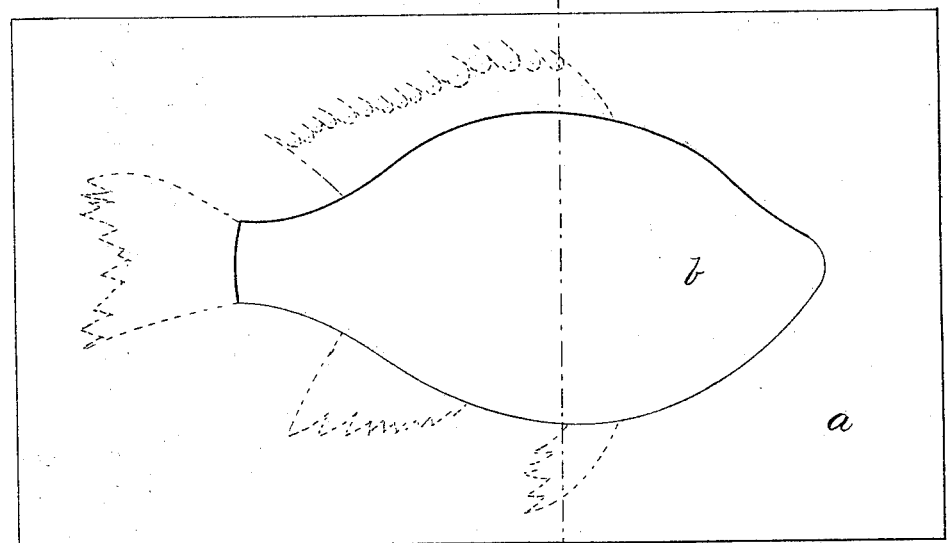
Figure 3:
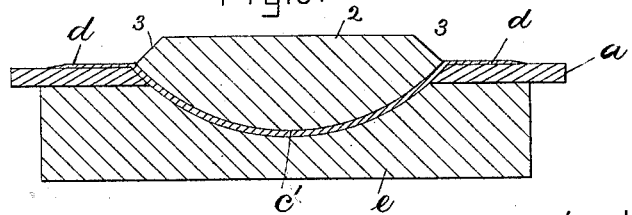

Figure 1 is a top view of the fish-skin when prepared and mounted in accordance with my invention; Fig. 2, a plan view of the mold-board for forming the mold thereof; Fig. 3, a sectional view of the skin in the mold, provided with a solid filling, ready for removal from the mold and for mounting, as shown in Fig. 1.

The mold-board *a* has an opening, *b*, therein corresponding in outline to the body *c* of the fish, (see Fig. 1,) exclusive of the fins *d* and tail *e*, the position of which is indicated in dotted lines. The outline of the portion *b* may be conveniently formed by laying the body of the fish *c* on the board *a* and marking around it with a pencil, after which the board is to be cut through, as by a pen-knife or other suitable instrument, on the line thus marked. The body of the fish is then laid in this opening, the fins *d* and tail *e* being spread out upon the surface thereof and pinned thereto if necessary. The board $a$ and fish therein are then inverted, and the surface $c'$ of the fish, projecting through the opening of the board, is properly treated to prevent adhesion of the mold material to be placed therein. Oiled tissue-paper may be employed for this purpose, it being fitted closely to the skin, or the skin may be smeared with oil, paraffine, or other suitable material. The mold material $e$, which may be of any suitable kind, preferably plaster-of-paris mixed with water in the well-known manner, is then placed upon the surface of the skin thus protected, and when set or solidified forms a firm mold, in which the body of the fish is held in its natural shape. The soft parts above the fins $d$ and tail $e$ are then carefully removed, leaving only one-half the skin $c'$, with the connected median fins and tail. The inside of this portion $c'$ of the skin is then to be treated with any suitable preservative substance, as by sprinkling arsenic thereon.

A glass eye may be inserted in the usual manner, and the skin may be stuffed or filled with any suitable substance without especial care being required to give it the proper convexity, as this will be insured on account of the rigid mold thereon. For this filling I prefer to use similar plastic material to that employed in the mold—as, for example, plaster-of-paris. When set the upper part of the plaster-of-paris may be smoothed over, as shown at 2 in Fig. 3, to afford a convenient surface for mounting, and the edge trimmed away or beveled, as at 3.

The skin $c'$, with its filling, may now be removed from the mold $a$ $e$, and its outer surface treated in any usual manner, as by varnishing.

A block of wood may be used to form the greater portion of the filling of the skin, it being embedded in the plastic material, which takes the proper form to fit the skin. Such a block may be easily attached by screws to a suitable board, $f$, as shown in Fig. 1.

I claim—

1. That improvement in the art or method of mounting skins of fishes which consists in forming a rigid mold of plastic material on the surface of the skin to be mounted before it is detached from the body of the fish, and thereafter removing the soft portions from the said skin and providing a stuffing or filling therefor before it is removed from the mold, whereby the natural form and convexity of the fish are preserved, substantially as described.

2. That improvement in the art or method of preparing the skins of fishes which consists in making a mold-board having a portion removed corresponding with the outline of the body of the fish, exclusive of median fins, and inserting the body of the fish in the opening, the median fins resting against the face thereof, and forming a mold of plastic material upon the body of the fish projecting beyond the other face thereof previous to removing the soft parts and stuffing the skin, substantially as described.

3. That improvement in the art or method of preparing skins of fishes which consists in forming a rigid mold on one-half the body of the fish, removing the soft parts from the skin resting in the said mold, and filling the said skin while in the mold with plastic material adapted to solidify therein, substantially as described.

In testimony whereof I have signed my name to this specification in the presence of two subscribing witnesses.

HERMAN E. DAVIDSON.

Witnesses:
 JOS. P. LIVERMORE,
 ARTHUR REYNOLDS.